(12) United States Patent
Morris et al.

(10) Patent No.: US 8,734,143 B2
(45) Date of Patent: May 27, 2014

(54) ADJUSTABLE DOUGH ROLLER DEVICE

(76) Inventors: Nigel Justin Morris, Enspijk (NL); Jan Vermeulen, Zuilichem (NL)

( * ) Notice: Subject to any disclaimer, the term of this patent is extended or adjusted under 35 U.S.C. 154(b) by 75 days.

(21) Appl. No.: 13/131,719

(22) PCT Filed: Nov. 19, 2009

(86) PCT No.: PCT/NL2009/050699
§ 371 (c)(1),
(2), (4) Date: Sep. 7, 2011

(87) PCT Pub. No.: WO2010/062172
PCT Pub. Date: Jun. 3, 2010

(65) Prior Publication Data
US 2011/0311698 A1 Dec. 22, 2011

(30) Foreign Application Priority Data
Nov. 28, 2008 (NL) ...................................... 2002261

(51) Int. Cl.
*A21C 3/02* (2006.01)
(52) U.S. Cl.
USPC ............ 425/101; 425/335; 425/367; 426/502
(58) Field of Classification Search
USPC .................. 425/92, 101, 335, 336, 363, 367; 426/502, 517
See application file for complete search history.

(56) References Cited

U.S. PATENT DOCUMENTS

| | | | | |
|---|---|---|---|---|
| 3,851,569 A | * | 12/1974 | Madrid | ......................... 425/335 |
| 4,057,377 A | | 11/1977 | Sakurazawa | |
| 4,111,109 A | * | 9/1978 | Sakurazawa | .................... 99/353 |
| 5,673,609 A | | 10/1997 | Sanchez et al. | |
| 6,263,788 B1 | | 7/2001 | Chiang | |
| 6,322,345 B1 | | 11/2001 | Zaltron | |
| 7,182,588 B2 | * | 2/2007 | Lambauer et al. | ............ 425/335 |

FOREIGN PATENT DOCUMENTS

| | | |
|---|---|---|
| CA | 2 378 882 A1 | 2/2001 |
| DE | 14 32 989 A1 | 8/1969 |
| EP | 1 082 903 A | 3/2001 |
| GB | 254 172 A | 7/1926 |
| GB | 1 043 736 A | 9/1966 |
| WO | 01/08497 A | 2/2001 |

* cited by examiner

*Primary Examiner* — James Mackey
(74) *Attorney, Agent, or Firm* — Ladas & Parry LLP (57) ABSTRACT

The invention relates to a dough roller device (2) comprising a first roller pair unit (21) and a second roller pair unit (22) situated below the first roller pair unit (21), wherein the relative position of the first and second roller pair units is adjustable. Preferably the rollers (31,32) of the first roller pair unit (21) define a passage for dough between the rollers, and wherein the relative position is adjustable for placing one of the rollers (33, 34) of the second roller pair unit (22) more or less below the passage. The invention further relates to an assembly for dough treatment, comprising a dough roller device (2) as disclosed above and a supply device for supplying dough, wherein the supply device comprises a conveyor (12) extending to an upper side of the dough roller device (2). The belt onto which the dough is deposited has flour dusted onto it before the dough is laid on the belt.

19 Claims, 4 Drawing Sheets

ADJUSTABLE DOUGH ROLLER DEVICE

BACKGROUND

The invention relates to a dough roller device comprising a first roller pair and a second roller pair situated below the first roller pair.

A process wherein dough is to be rolled is rather complex since a large set of parameters is relevant for influencing the quality of the rolled dough. When a dough roller apparatus is operating under a temperature condition which is, for example, ten degrees exceeding the optimal process temperature, the quality of produced dough portions can be very poor. Dough is an elastic, stretchable and extendable material which properties are rather unique compared to other materials. These properties are relevant when dough is processed, in particular when rolled using a dough roller device of the type disclosed above. Both the pressing forces of the rollers squeezing the dough and the gravity forces acting on the dough may cause a change in the form and the structure of the dough.

A dough roller apparatus is described in DE 102006046504 A1. This dough roller apparatus comprises a first pair of rollers receiving a flow of dough which continues flowing into a second pair of rollers. Near the second pair of rollers scrapers are provided for scraping remaining dough particles from the circumferential surface of these rollers. These scrapers are arranged such as to be adjusted during the rolling process in order to control the thickness and the strength of the dough. The thickness and the strength of the dough can also be controlled by adjusting the dough passage within the second roller pair.

For producing dough strips made from, for example, a weaker type of dough, the dough roller apparatus according to DE 102006046504 A1 has a difficulty in controlling the flow of dough by setting the position of the scrapers and the gap of the dough passage within the second roller pair, achieving a certain strength and thickness of the dough strip.

The aim of the present invention is to provide a dough roller apparatus for forming a strip of dough, preferably a continues strip, which provides for easy and quickly adjusting and setting of the rollers in order to control the flow of dough through the apparatus in dependence of the type of dough to be produced.

SUMMARY OF THE INVENTION

The invention provides, in one aspect, a dough roller device comprising a first roller pair unit and a second roller pair unit situated below the first roller pair unit, wherein the relative position of the first and second roller pair units is adjustable.

Material properties of dough suitable for Ciabatta, for example, differs significantly from those of dough suitable for Baguettes. Weaker samples of dough, for example soft and/or yielding dough, will stretch and extend during dropping through the first roller pair more than stiffer samples. By adjusting the whole second roller pair unit, with respect to the first roller pair unit, or vice versa, the flow of the dough trough the device can be controlled and adjusted in order to minimize a change in and/or damage of the structure of the dough that is being processed by the dough roller device.

In an embodiment, the rollers of the first roller pair unit define a passage for dough between said rollers, and wherein the relative position is adjustable for placing one of the rollers of the second roller pair unit more below the passage, or less. The dough leaving the first roller pair will move downwards from the passage by gravity. Depending on dough properties, this may result in stretching and extending of the dough, which may result in a lower quality of a dough strip. Therefore, it is advantageous to control the flow of dough by decelerating the flow in vertical direction and/or deflecting the flow from its vertical direction, which is achieved by positioning one of the rollers of the second roller pair more in the flow path of the dough below the passage, or less.

In an embodiment, the relative position is adjustable for setting a deflection of a flow of dough coming out of the passage. By adjusting the mutual position, such as to situate one of the rollers of the second roller pair more, or less, below the passage, the amount of deflection of the flow of the dough coming out of the passage can be adjusted.

In an embodiment, the relative position of the second roller pair unit with respect to the first roller pair unit is adjustable in several different positions, wherein the different positions are associated with different dough types, dough structures and/or working conditions. The availability of the different positions makes it easy to switch the relative positions corresponding with the type of dough to be processed.

In an embodiment, the relative position of the second roller pair unit is adjustable, with respect to the first roller pair unit, in a direction substantially transverse to an axis of rotation of at least one of the rollers. Adjusting the flow of dough in a most direct manner and thus most effectively is achieved by providing the second roller pair being adjusted transverse to said flow. This can be achieved by an adjustment transverse to any one of the axes of rotation of the rollers. It is noted that the axes of rotation of the rollers usually are substantially parallel to each other.

In an embodiment, the relative position of the second roller pair unit is adjustable, with respect to the first roller pair unit, in a substantial horizontal direction. When adjusting the mutual position of the second roller pair in respect of the first roller pair in a horizontal direction, the vertical flow of the dough out of the passage of the first roller pair unit can be caught and/or supported by one of the rollers of the second roller pair unit to limit the influence of gravity.

In an embodiment, the first roller pair unit and the second roller pair unit are slidable with respect to each other. When both the first roller pair and the second roller pair are arranged within a common frame, the second roller pair may be shifted or slid in respect to the first roller pair. Preferably the second roller pair unit is slidable in a substantially horizontal direction with respect to the first roller pair unit. Such a motion is easy to adjust and can be achieved by a simple construction.

In an embodiment, the dough roller device comprises a third roller pair unit situated below the second roller pair unit. The third roller pair may determine the thickness of the dough strip when the rollers of the third roller pair are the last rollers within the rolling process. Specifically where the third roller pair is to determine the thickness of the dough strip, the second roller pair is preferably used for controlling the flow of dough depending on the property of stretching and the extending under the influence of gravity. However, the second roller pair unit can also be used for adjusting the thickness of the dough strip.

In an embodiment, the third roller pair unit is placed substantially at a fixed position with respect to the first roller pair unit. Preferably, the position of the second roller pair unit is adjustable with respect to the position of the first and third roller pair units. Since one of the rollers of the second roller pair can be positioned such as to cause a first deflection of the flow of dough, substantially the same amount of deflection can be achieved for a second deflection between the second roller pair and the third roller pair, when the position of the third roller pair is fixed in respect to the first roller pair.

Furthermore it is advantageous to maintain the first and third roller unit at a fixed position in the device, providing a fixed input position and a fixed output position for the dough roller device.

In an embodiment, at least one of the roller pair units has only one roller pair. In an embodiment each of the roller pair units comprises only one roller pair. In this case the relative positions of the roller pairs can be adjusted by adjusting the relative position of the roller pair units.

In an embodiment, at least the second roller pair unit has its own driving gear for driving the rollers of the roller pair unit, allowing an adjustment of the position of the second roller pair unit with respect to the first roller pair unit, independent from the driving gear of the first roller pair. In an embodiment each of the roller pair units comprises its own driving gear for driving the rollers of the roller pair unit.

In an embodiment each roller of a roller pair unit is coupled with a separate driving gear for driving the roller. Driving each roller separately provides an additional means for controlling the flow of dough and obtaining a desirable quality of dough.

In an embodiment, the driving gear for the rollers, such as motors, preferably electrical motors, and/or transmissions, are arranged for driving the rollers of the roller pair with a different rotational speed. In this case the circumferential speed of the surface of the rollers can be adapted to the local speed of the dough abutting said surface.

In particular when a roller pair is used for deflecting the flow of dough, one of the rollers, the first roller, deflects the dough and carries the dough towards the other one of the rollers, the second roller. The velocity of the deflected dough is, inter alia, determined by the surface velocity of the first roller. Due to the distance between the first and second roller, the velocity of the dough at the surface of the second roller will be higher. By substantially matching the velocity of the second roller to the higher velocity of the dough, a change in and/or a damaging of the structure the dough that is being processed by the dough roller device can be further reduced.

In an embodiment, a speed difference is adjustable depending on a thickness of a passage between the rollers of a roller pair unit. The relative positions of the rollers of a roller pair unit can be adjusted for achieving a desired thickness of a dough strip, for any type of dough. When adjusting the relative distance between rollers of this roller pair, thus changing the thickness of the passage between these rollers, the speed difference may be adjusted.

In an embodiment, each roller pair unit has only one roller pair.

In an embodiment, at least one of the rollers is provided with a corrugated surface, preferably a surface comprising a plurality of adjacently arranged grooves which extend substantially parallel to a rotation axis of the roller. The corrugated surface, in particular the groves, are provided to give the roller more grip on the dough without substantially damaging the surface of the dough. In order to further reduce the risk of damaging the surface of the dough, the grooves are arranged to provide a substantially continuous surface having a small gradients of slope, for example a saw-tooth wave form or a sine wave form.

In an embodiment, the device comprises a scraping device having a scraping edge which extends substantially parallel to the rotation axis of the roller, wherein the scraping edge is biased against the grooved surface. In an embodiment, the scraping edge abuts the grooved surface at a position below the passage for removing the dough from said surface.

According to a second aspect, the invention provides an assembly having a dough roller device as described above, and further comprising a supply device for supplying dough, wherein the supply device comprises a conveyor extending to an upper side of the dough roller device. In such an assembly having a dough roller device, dough can be supplied to the dough roller device in a desirable way, preferably as a substantially continuous or semi-continuous dough piece.

In an embodiment, the supply device comprises a hopper provided with output means situated in a bottom surface of said hopper, which output means are suitable for periodically outputting a dough portion on the conveyor. In such hopper, a supply of kneaded dough is to be cut into a number of dough portions. Dough cutting means are arranged at the bottom surface of the hopper, where also the output means are arranged for supplying dough portions to the conveyor. A cycle of cutting and outputting a dough portion can be repeated, such that a series of dough portions are provided on the conveyor.

In an embodiment, a frequency of said periodically outputting, or of the cycle of cutting and outputting, is set in dependence of a speed of the conveyor. This may provide a regular series of dough portions to be inputted at the dough roller device. In an embodiment the dough portions in the series of dough portion, overlap to a small extent for providing a substantially continuous input of dough to the dough roller device.

In an embodiment, the conveyor comprises a conveyor belt having longitudinal edges substantially parallel to the conveying direction, wherein the edges are folded upwards at least near an end of the conveyor situated near the roller device. In an embodiment the edges are folded upwards to provide a trough which extends at least from the hopper to the end of the conveyor situated near the roller device. The conveyor belt edges parallel to the moving direction of the conveyor which are in a raised position in respect of the belt between these edges, result in forming a trough or bowl for accommodating the dough inputted into the dough roller device. Within this bowl shaped cross section of the conveyor belt, a dough portion is guided to properly reach the dough roller device. Preferably the centre of the conveyor, in particular the centre of the trough or bowl, is arranged substantially at the centre of the rollers of the first roller pair unit.

In an embodiment, the assembly comprises a first powdering device situated above the conveyor belt, upstream of the hopper. In an embodiment, the assembly further comprises a second powdering device between the hopper and the dough roller device. In an embodiment, the powdering device comprises a flour duster for spreading flour onto the conveyor belt and/or on the dough. By dusting flour on the conveyor belt, at least before the dough is outputted by the hopper onto the conveyor, and/or on the dough, at least before it enters the dough roller device, a sticking of dough to the rollers of the dough roller device can be substantially reduced. In particular, for most dough types it is no longer necessary to provide oil on the rollers and/or the stationary surfaces of the dough roller device, as is usually being done for preventing the sticking of the dough.

Alternatively, the second powdering device may be arranged above at least one of the rollers of the dough roller device. In an embodiment the second powdering device is arranged above the first roller pair unit for putting flour onto the roller, in particular a receiving roller of the first roller pair which, in use, contacts the surface of the dough that on the conveyor faced away from the surface of the conveyor belt.

According to a third aspect, the invention provides a method for rolling dough in a dough roller device as described above, comprising the step of adjusting the relative position of the first and second roller pair unit, at least before or during a change of dough types, dough structures and/or working conditions. In an embodiment, the relative position of the second roller pair unit is adjusted with respect to the first roller pair unit.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
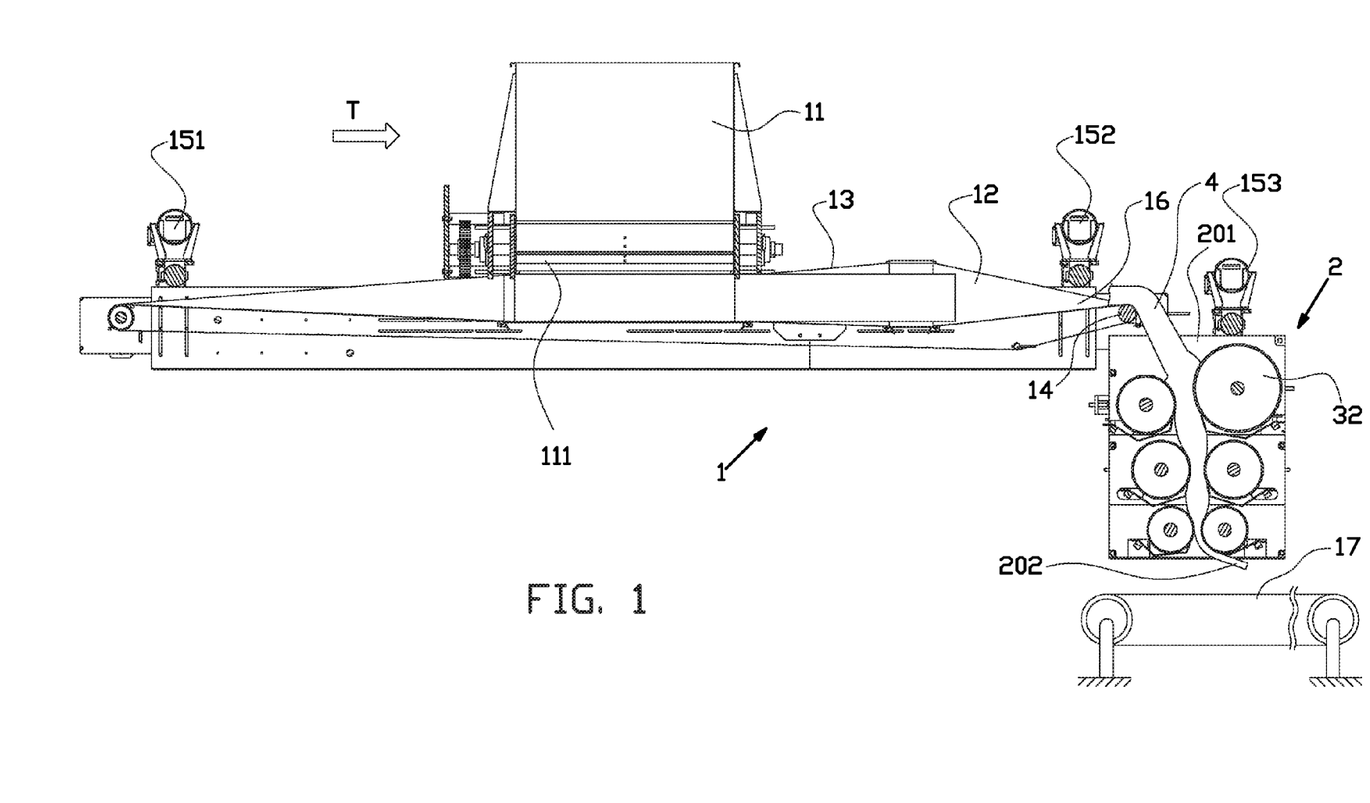
FIG. 1 shows a side view of a dough processing machine comprising a dough roller device according to the invention.

FIG. 1 shows an example of an assembly for dough processing 1 comprising a dough roller device 2 according to the invention. A supply of dough can be supplied to a hopper 11, which is arranged for accommodating kneaded dough. A bottom side 111 of the hopper 11 comprises a longitudinal extending funnel-shaped part comprising a cutting mechanism, not shown in detail, for forming longitudinal extending pieces of dough. Once the longitudinal piece of dough is cut, it is transferred to the conveyor belt 12 which conveys the dough in a transportation direction T, for supplying the dough to the dough roller device 2.

In order to change from a batch type supplying of dough to the hopper 11 into a substantially continuous process of supplying dough to the roller device 2, the processes of cutting the dough, transferring the dough and conveying the dough are controlled in such a way that a next piece of dough is to be transferred onto the conveyor belt 12 as soon as a rear side of a previous piece of dough just left a position where a front side of the next piece need to be dropped. Alternatively, in order to obtain a continuous string of dough, the rear end of the previous piece of dough is overlapped by the front end of the next piece of dough. In this way, a substantially continuous dough portion is to be transferred to the dough roller device 2.

The conveyor belt 12 may be flat. However, it may be advantageous to provide the transport belt with edges 13 of the belt extending in the moving direction T being raised. These raised edges 13 form a bowl wherein the dough string can be laid down, for being guided and/or centered during the transport of the dough to an end roller 14 of the conveyor 12.

Upstream of the hopper 11 a first flour duster 151 is arranged above the conveyor for dusting the surface of the conveyor belt before dough is placed on said belt. Furthermore, between the hopper 11 and the dough roller device 2, a second flour duster 152 is arranged above the conveyor belt 12 for powdering the dough pieces being transported to be dusted with flour. Dough is usually rather sticky causing dough getting stuck to parts of the dough processing assembly 1 which contact the dough. The belt 12 onto which the dough is deposited has flour dusted onto it before the dough is laid on the belt 12. The flour substantially prevents dough from sticking to these parts achieving a longer period of time between two subsequent operations of cleaning the dough processing assembly 1.

In stead of dusting the dough with the second flour duster 152 arranged above the conveyor belt, the second flour duster 153 can also be arranged above the dough roller device 2, in particular above a receiving roller 32, for dusting the surface of the roller 32.

Dough being conveyed from the hopper 11 to an end 14 of the conveyor belt 12, is to leave the conveyor belt 12 and the dough flow 16 flows towards the dough roller device 2, entering it at a top side 201, flowing through it and leaving it at a bottom side 202. The rolled dough is to be transferred onto a next belt conveyor 17 which may be part of a subsequent dough processing assembly, for example for forming the dough into rolls, bread pieces, and the like.

Figure 2:
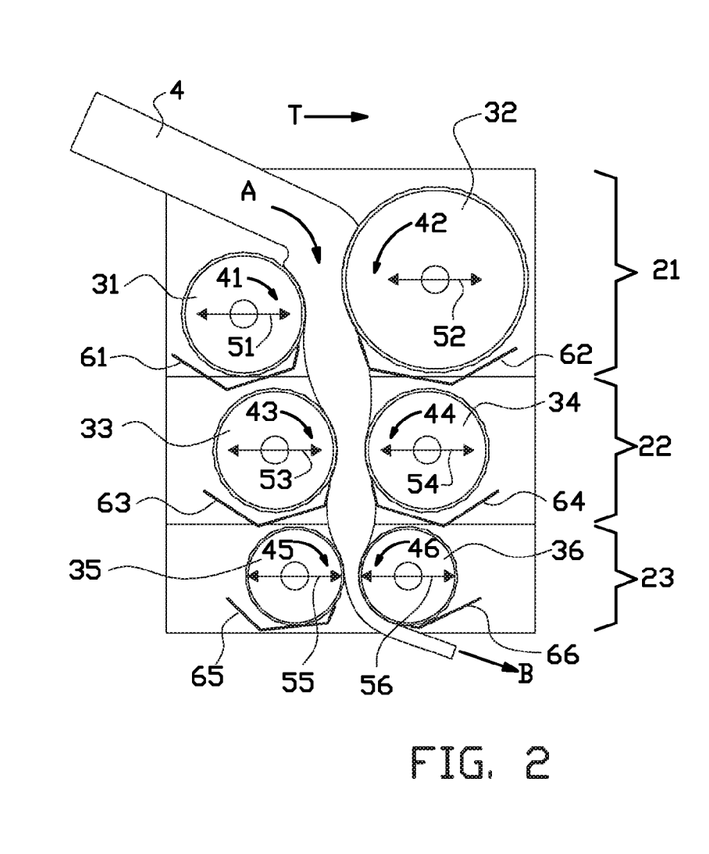
FIG. 2 shows a cross sectional side view of a dough roller device comprising a first pair of dough rollers, a second pair of dough rollers situated below the first pair of dough rollers, and a third pair of dough rollers situated below under the second pair of dough rollers.

The roller process being executed by the dough roller device 2, is shown more in detail in FIG. 2. The dough roller device 2 comprising a first roller unit 21 comprising a first roller pair 31, 32, and a second roller unit 22 comprising a second roller pair 33, 34, situated below the first roller pair 31, 32, wherein the relative position of the first and second roller units 21, 22 is adjustable. Furthermore the exemplary embodiment shown in FIG. 2 also comprises a third roller unit 23 comprising a third roller pair 35, 36 situated below the second roller pair 33, 34.

In this example device, dough 4 is firstly to be rolled between a first dough roller 31 and a second dough roller 32 of the first roller pair unit 21, also denoted as the infeed rollers (invoerwalsen). The first roller 31 having a clockwise rotation direction 41 and the second roller 32 having a counter clockwise rotation direction 42. The first roller 31 and second roller 32 are substantially horizontally spaced from each for providing a passage for dough therein between.

In this embodiment, the second roller 32, which receives the dough 4 has a larger diameter than the first roller 31. The larger diameter of receiving roller 32 aids the infeed of the dough into the gap between the rollers 31, 32.

Secondly, dough 4 is to be rolled between a third dough roller 33 and a fourth dough roller 34 of the second roller pair unit 22, also denoted as the compacting rollers (compacteerwalsen). The third roller 33 having a clockwise rotation direction 43 and the fourth roller 34 having a counter clockwise rotation direction 44. The third roller 35 and fourth roller 36 are substantially horizontally spaced from each other for providing a passage for dough in between them. The third 33 and fourth 34 rollers of the exemplary embodiment shown in FIGS. 2 and 3 have substantially the same diameters.

Thirdly, dough 4 is to be rolled between a fifth dough roller 35 and a sixth dough roller 36 of the third roller pair unit 23, also denoted as calibrating rollers (calibreerwalsen). The fifth roller 35 having a clockwise rotation direction 45 and the sixth roller 36 having a counter clockwise rotation direction 46. The fifth roller 35 and sixth roller 36 are substantially horizontally spaced from each other for providing a passage for dough in between them. The fifth roller 35 and a sixth 35 rollers of the exemplary embodiment shown in FIGS. 2 and 3 have substantially the same diameters.

It is noted that the spacing and diameter dimensions of the rollers 31, 32, 33, 34, 35, 36 may be varied for obtaining a more optimal setting of the mutual position of these rollers.

Dough 4 flowing in a direction A enters the dough roller device 2 at the top side particularly between the first roller 31 and the second roller 32. Dough 4 is to be rolled and leaves the passage between the rollers 31, 32 in a substantially vertical direction downwards. The flow of dough 4 continues downwards, flowing through a space between the third 33 and the fourth 34 roller, subsequently flowing through a space between the fifth 35 and the sixth 36 roller, and leaving the roller device at the bottom side B.

In order to process the dough into the required thickness, the dough rollers 31, 32; 33, 34; 35, 36 within a roller unit 21, 22, 23 may be displaced in a substantially horizontal direction 51, 52; 53, 54; 55, 56 respectively for adjusting the rollers within each roller unit into a mutual optimal and desirable setting.

The process of rolling, as shown in FIG. 2, comprises a flow of dough 4 which constitutes an approximately vertical line extending between a flowing direction A towards a flowing direction B along which dough 4 is flowing. Along this path, dough 4 is, inter alia, exposed to pressing forces of the rollers causing squeezing, and gravity force which may cause stretching and extension of dough portions in-between the roller pair units.

Figure 3:
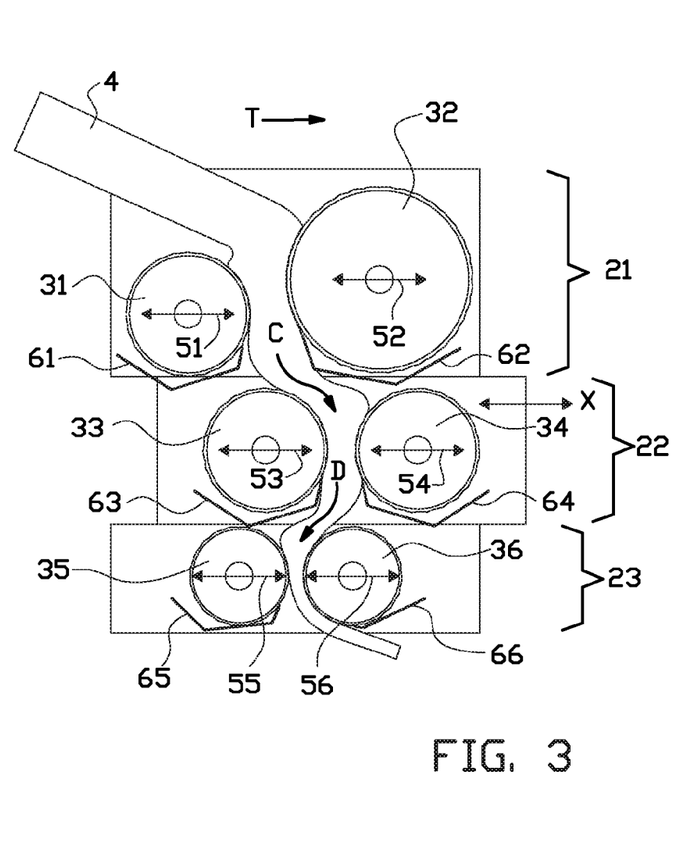
FIG. 3 shows a cross sectional side view of a dough roller device according to FIG. 2, wherein the second pair of dough rollers is horizontally displaced in respect of the first pair of dough rollers.

FIG. 3 shows the dough roller device 2 according to FIG. 2 wherein the second roller pair unit 22, comprising the third roller 33 and the fourth roller 34, is displaced as a whole at least with respect to the first roller pair unit 21. The displacement X causes dough 4 leaving the space between the first roller pair 21 at a bottom side in a direction C wherein dough is prevented from dropping into an approximate free fall condition. In fact, the flow of dough 4 is decelerated since the third roller 33 is blocking a downward flow and causing a flow being deflected having a component in the horizontal direction. The horizontally shifted second roller pair 22 introduces resistance in the downward flow of dough 4 which prevents a dough type having weaker properties, for example soft and/or yielding dough, from stretching and extending too much. By adjusting a position of the second roller pair 22 in respect of a position of the first roller pair 21, an optimal flow of dough 4 may be obtained depending on the type of dough currently being processed.

The third roller pair 23 situated below the second roller pair 22 is basically to be kept into its position. The reason to set the second roller pair 22 displaced over a distance X in respect of the first roller pair 21, is basically also applicable for setting the second roller pair displaced over a distance X in respect of the third roller pair 23 in the opposite direction. Namely, an adjusting displacement X provides control of the flow of dough 4 in a direction D, influencing stretching and extending properties of dough 4, while obtaining the same thickness of a strip independent of the type of dough 4 to be produced.

For producing a dough strip having an other strip thickness, the space between the fifth roller 35 and the sixth roller 36 may be adjusted by a displacement of the fifth roller 35 in a direction 45 and/or by a displacement of the sixth roller 36 in a direction 46, independent from setting of the third roller pair 23.

Figure 4:
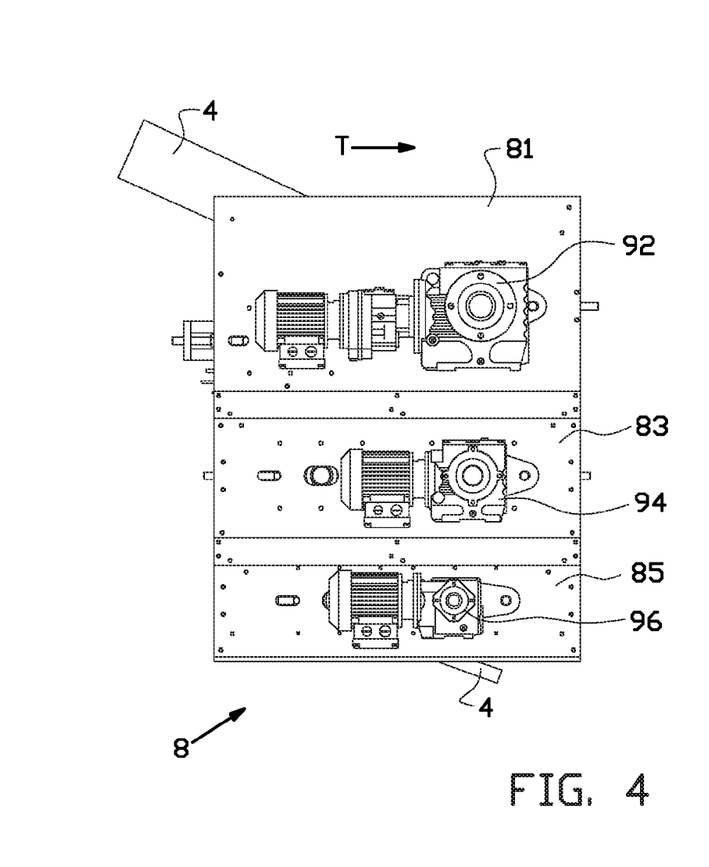
FIG. 4 shows a side view of a dough roller device according to FIG. 2.
Figure 5:
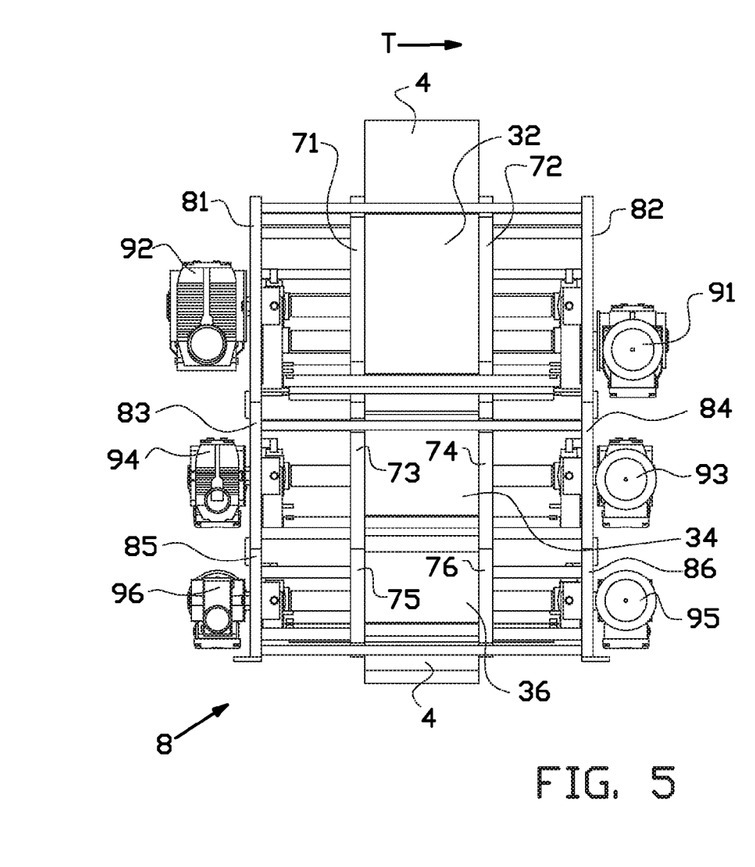
FIG. 5 shows a front view of a dough roller device according to FIG. 2.

FIGS. 4 and 5 show the frame 8 of the exemplary embodiment of the dough roller device 2. Each roller 31, 32, 33, 34, 35, 36 is coupled to its own driving motor 91, 92, 93, 94, 95, 96 respectively. The motors 91-96 are arranged at the outside facing surfaces of the walls 81, 82 of the frame 8. Since each roller is provided with its own driving motor, the speed of each roller can be set individually. For example the speed of each roller is set so that is circumferential velocity substantially matches the local velocity of the dough abutting said roller. In this way shear forces between the dough and the abutting roller can be optimized, in particular minimized.

Inside the frame 8 the rollers 31, 32; 33, 34; 35, 36 are arranged between wall panels 71, 72; 73, 74; 75, 76 respectively. These wall panels 71-76 are arranged for guiding dough 4 and confining the dough 4 to within these panels. The wall panels 71, 72; 73, 74; 75, 76 can slide away from the rollers 31, 32; 33, 34; 35, 36, in particular towards the walls 81, 82 of the frame 8 for cleaning purposes.

Figure 6:
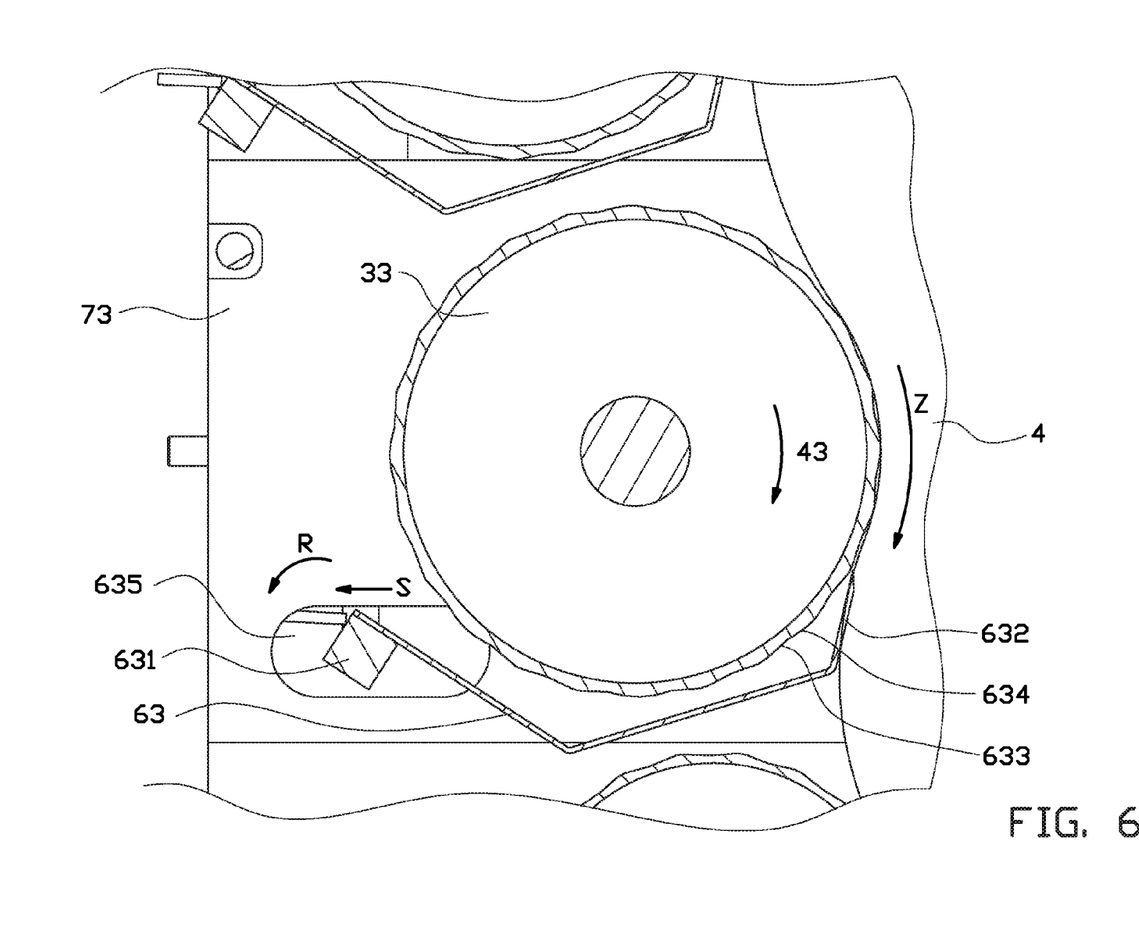
FIG. 6 shows a cross sectional side view of a dough roller provided with a scraper of a dough roller device according to FIG. 2.

As shown in FIG. 6, each dough roller comprises longitudinal grooves 633 on the circumferential surface for abutment of dough 4. Since dough is sticky, despite of the flour being applied by the powdering devices 151, and 152 or 153, parts of dough 4 may adhere in these grooves. In order to keep the surface of the rolls, and particular the grooves, as free as possible from dough, dough scrapers 61-66 are arranged at the frame wherein dough rollers 31-36 are supported as well.

FIG. 6 shows a dough scraper 63 more in detail. At a support side 631, a dough scraper is supported at side walls 81, 82 of the frame 8 shown in FIG. 5. Such scrapers extend parallel to the axis of rotation of a roller of a roller pair. An outer edge 632 of such scraper extends parallel to the axis of rotation as well, extending over substantially the same length as a length of the roller, engaging with the curved grooves 633, 634 situated on the circumferential surface of the roller 33. The outer edge 632 follows a contour comprising a set of curves 633, 634 when the roller is rotating. The edge 632 of the scraper guides the dough 4 flowing in a direction Z, preventing dough from sticking at the circumferential surface of the rollers.

In order to slightly press and bias the edge 632 of the scraper against the circumferential surface of the roller, the support side 631 of the scraper is mounted with an pre-adjusted angle according to a direction R. The scraper 63 preferably is made from a flexible material so that it acts as a leaf spring. In this case the pressing force between the edge 632 of the scraper and the circumferential surface of the roller can be set by adjusting the angle in direction R.

The support side 631 of the scraper may be mounted with a pre-adjusted displacement in a direction S in order to position the edge 632 with respect to the circumferential surface of the roller 33.

A hole 635 in side walls 73,74 is arranged for allowing the support 631 of the scraper to pass and connect to side walls 81, 82 of a frame 8

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. Dough roller device comprising a first roller pair unit and a second roller pair unit situated below the first roller pair unit, wherein the relative position of the first and second roller pair units is adjustable, wherein the second roller pair unit is displaceable as a whole with respect to the first roller pair unit.

2. Dough roller device according to claim 1, wherein the rollers of the first roller pair unit define a passage for dough between said rollers, and wherein the relative position is adjustable for placing one of the rollers of the second roller pair unit more or less below the passage.

3. Dough roller device according to claim 2, wherein the relative position is adjustable for setting a deflection of a flow of dough coming out of the passage.

4. Dough roller device according to claim 1, wherein the relative position of the second roller pair unit with respect to the first roller pair unit is adjustable in several different positions, wherein the different positions are associated with different dough types, dough structures and/or working conditions.

5. Dough roller device according to claim 1, wherein the relative position of the second roller pair unit is adjustable, with respect to the first roller pair unit, in a direction substantially transverse to an axis of rotation of at least one of the rollers, and/or wherein the relative position of the second roller pair unit is adjustable, with respect to the first roller pair unit, in a substantial horizontal direction.

6. Dough roller device according to claim 1, wherein the first roller pair unit and the second roller pair unit are slideable with respect to each other.

7. Dough roller device according to claim 1, comprising a third roller pair unit situated below the second roller pair unit.

8. Dough roller device according to claim 6, wherein the third roller pair unit is placed substantially at a fixed position with respect to the first roller pair unit.

9. Dough roller device according to claim 1, wherein at least one of the roller pair units comprises only one roller pair.

10. Dough roller device according to claim 1, wherein at least the second the second roller pair unit has its own driving gear for driving the rollers of the roller pair unit and/or wherein each roller of a roller pair unit is coupled with a separate driving gear for driving the roller.

11. Dough roller device according to claim 9, wherein the driving gear for the rollers, such as motors, and/or transmissions, are arranged for driving the rollers of the roller pair unit with a different rotational speed and/or wherein the speed difference is adjusted in dependence to a thickness of a passage between the rollers of the roller pair unit.

12. Dough roller device according to claim 1, wherein at least one of the rollers is provided with a corrugated surface, and/or wherein the device comprises a scraping device having a scraping edge which extends substantially parallel to the rotation axis of the roller, wherein the scraping edge is biased against the grooved surface.

13. Assembly comprising a dough roller device according claim 1, and a supply device for supplying dough, wherein the supply device comprises a conveyor extending to an upper side of the dough roller device.

14. Assembly according to claim 13, wherein the supply device comprises a hopper provided with output means situated in a bottom surface of said hopper, which output means are suitable for periodically outputting a dough portion on the conveyor.

15. Assembly according to claim 14, wherein a frequency of said periodically outputting is set in dependence with a speed of the conveyor.

16. Assembly according to claim 13, wherein the conveyor comprises a conveyor belt having longitudinal edges substantially parallel to the conveying direction, wherein the edges are folded upwards at least near an end of the conveyor situated near the roller device.

17. Assembly according to claim 13, further comprising a powdering device situated between the hopper and the dough roller device, and/or a powdering device situated above at least one of the rollers.

18. Assembly according to claim 17, wherein the powdering device comprises a flour duster for sprinkling flour onto the dough and/or the at least one of the rollers.

19. Method for rolling dough in a dough roller device according to claim 1, comprising the step of adjusting the relative position of the first and second roller pair unit, at least before or during a change of dough types, dough structures and/or working conditions wherein the relative position of the second roller pair unit is adjusted as a whole with respect to the first roller pair unit.

* * * * *

UNITED STATES PATENT AND TRADEMARK OFFICE
CERTIFICATE OF CORRECTION

| | |
|---|---|
| PATENT NO. | : 8,734,143 B2 |
| APPLICATION NO. | : 13/131719 |
| DATED | : May 27, 2014 |
| INVENTOR(S) | : Morris et al. |

Page 1 of 1

It is certified that error appears in the above-identified patent and that said Letters Patent is hereby corrected as shown below:

On the Title page, insert item (73) -- Johan Hendrik Bernard Kaak, Gaanderen, Netherlands --

Signed and Sealed this
Thirtieth Day of June, 2015

Michelle K. Lee
*Director of the United States Patent and Trademark Office*